350-423

OR  3,876,289     SR

United States
DeVeer et al.

[11] 3,876,289
[45] Apr. 8, 1975

[54] ILLUMINATION ZOOM SYSTEM FOR MICROSCOPES

[75] Inventors: Johannes D. DeVeer, Harvard, Mass.; Klaus P. Schindl, Vienna; Alois F. Dehlink, Vosendorf, both of Australia

[73] Assignee: American Optical Corporation, Southbridge, Mass.

[22] Filed: Mar. 26, 1973

[21] Appl. No.: 345,047

[52] U.S. Cl. ................................. 350/184; 350/87
[51] Int. Cl. .......................................... G02b 15/00
[58] Field of Search .............................. 350/184, 87

[56] References Cited
UNITED STATES PATENTS
2,078,586   4/1937   Richter .............................. 350/184
3,051,052   8/1962   Bergstein .......................... 350/184

*Primary Examiner*—Ronald L. Wibert
*Assistant Examiner*—Conrad Clark
*Attorney, Agent, or Firm*—Alan H. Spencer; William C. Nealon; Howard R. Berkenstock, Jr.

[57] ABSTRACT

A microscope illumination system having a zoom unit located before the field diaphragm is useful to provide maximum illumination for objectives from 10 to 110X, when using a suitable condenser, without the disadvantages of other systems. The zoom unit comprises a positive lens, a negative lens and a positive lens in series with the two positive lenses connected together and movable with respect to the negative lens along the optical axis as a unit.

3 Claims, 2 Drawing Figures

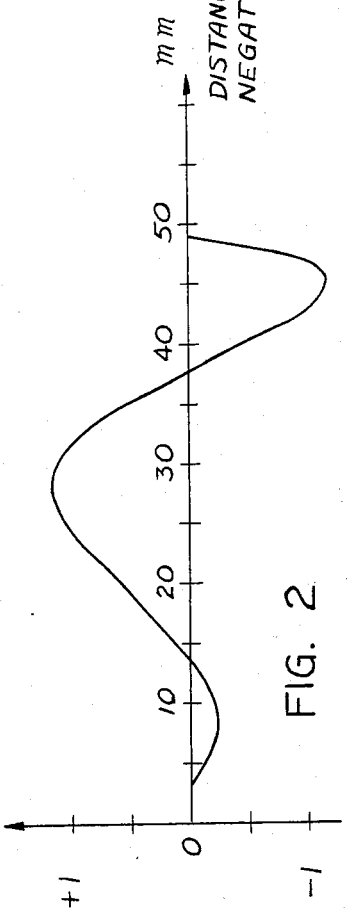
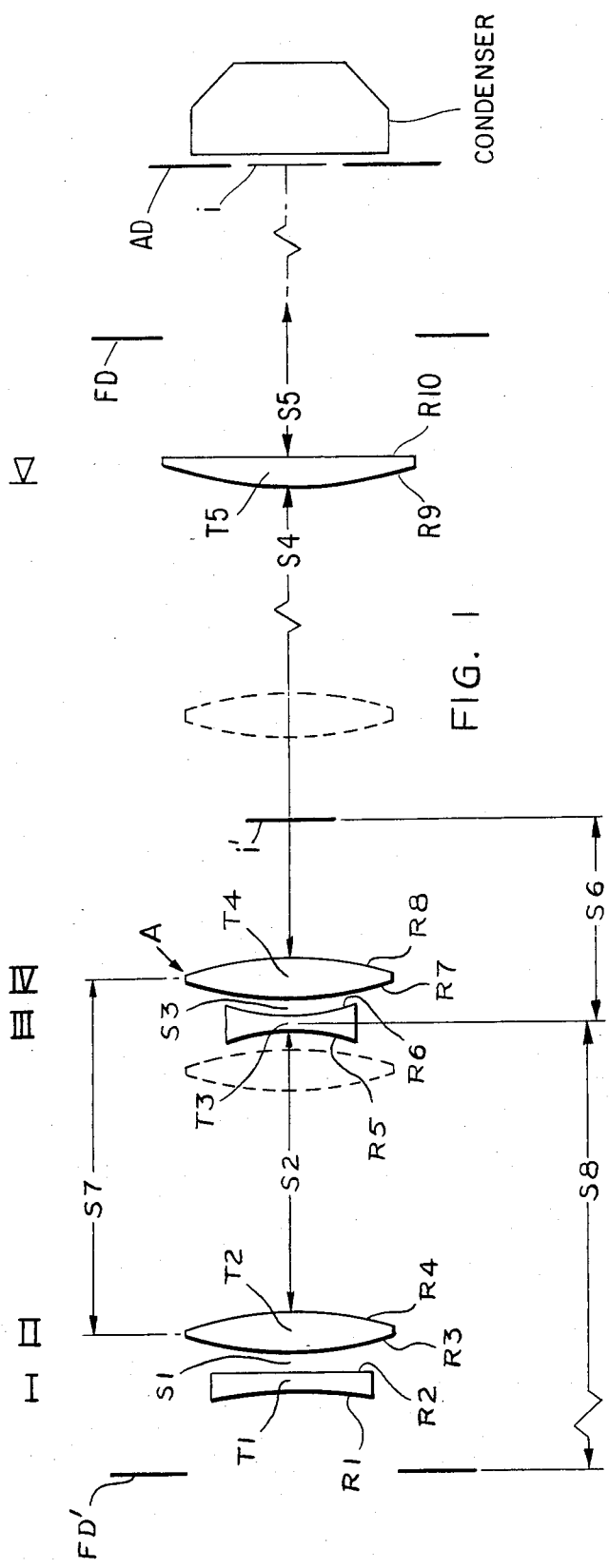

ILLUMINATION ZOOM SYSTEM FOR MICROSCOPES

BACKGROUND OF THE INVENTION

Zoom units in illumination systems are very desirable in order to properly fill the field and pupil for objectives of varying powers. Microscopes having zoom units in the illumination systems are known, but suffer disadvantages frequently making them either undesirable, or at best, of little advantage. The most common form of illumination system with a zoom has the field diaphragm located before the zoom. The principal disadvantage of this type of system is the very high quality of the optical system necessary to produce an image of the field diaphragm for interference contrast use. A further disadvantage of this type of system is that the optics necessary to provide proper reproduction of the field diaphragm severely restricts the UV light transmitted and prevents or significantly impairs fluorescent microscopy studies.

Other forms of zoom units are known but generally have the disadvantage of not filling the entire field diaphragm with light and simultaneously extending the image of the light source across the entire aperture diaphragm. A further disadvantage of prior art systems is the utilization of uncompensated or mechanically compensated zoom units. The former offers little advantage to a microscope illumination system without any zoom and the mechanically compensated systems are complex, delicate, and expensive to construct.

OBJECTS OF THE PRESENT INVENTION

It is one object of the present invention to provide a microscope illumination system having a zoom unit located between the light source and the field diaphragm.

It is another object of the present invention to provide a zoom unit having an illumination system which fills the field diaphragm with light and simultaneously extends the image of the light source across the entire aperture diaphragm.

It is another object of the present invention to provide an optically compensated zoom unit in a microscope illumination system.

It is still a further object of the present invention to provide an optically compensated zoom unit located at the image of the light source and between the light source and field diaphragm.

BRIEF DESCRIPTION OF THE INVENTION

A zoom unit having positive-negative-positive lens elements, with the negative element being fixed and the positive elements being rigidly connected and slidable along the optical axis which is located between the light source and field diaphragm permits the field diaphragm to be filled with light and the image of the light source to extend across the entire aperture diaphragm when the field stop and diaphragm are adjusted over a wide range.

FIG. 1 is an optical diagram of a portion of a microscope illumination system, illustrating one embodiment of a zoom unit according to the present invention.

FIG. 2 is a graph, demonstrating the optical compensation of the preferred embodiment.

DETAILED DESCRIPTION OF THE INVENTION

The drawing is an optical diagram of a preferred form of the present invention wherein A generally designates the zoom lens unit positioned in optical alignment intermediate the light source (not shown) and field diaphragm FD. The zoom unit has three lens components designated II, III and IV. Component III is a stationary optically aligned double concave negative singlet. Components II and IV are optically aligned double convex singlets positioned on opposite sides of the stationary component having variable spaces, respectively S1 – S2 and S3 – S4. Components II and IV are moved in unison along the optical axis to provide a fully illuminated field in the field diaphragm FD and extend the image $i$ of the light source across the entire aperture diaphragm AD. The aperture diaphragm referred to is near the front focal plane of the condenser.

The successive air spaces of the system are designated S1 – S5, respectively. S6 designates the distance from the center of the fixed component III of the zoom unit to the plane of the intermediate image $i$ of the light source in the preferred embodiment. S8 designates the distance between the center of fixed lens III and the image of the field diaphragm FD' projected through the zoom unit. S7 designates the fixed distance between movable components II and IV of the zoom unit. Axial lens thicknesses are designated T1 – T5, respectively and successive radii of curvature are designated R1 – R10, respectively, where the minus sign applies to surfaces whose center of curvature lies on the field diaphragm side of their vertices. The refractive indices and Abbe number of the glasses in the successive lenses are designated ND1 to ND5 and $\nu$1 to $\nu$5, respectively.

In the table below, system values are presented for the preferred embodiment of the present invention. Thicknesses, radii and distances are in millimeters. The values of collector system element I and telescope lens V are not an essential part of the present invention and those skilled in the art are capable of any necessary modifications to adapt the same to conventional microscope illumination systems.

A system according to the present invention will provide a zoom range of about 1 to 8X. Although a zoom of only 1 to 4X is necessary to fill the pupil of a 10X – 0.32NA objective and a 100X – 1.32NA objective from a filament illumination source, the additional zoom range enables one to use the same zoom system to fill the entire pupil with a hot spot of a gas discharge lamp.

|  | RADIUS R | THICKNESS T | REFRACTIVE INDEX ND | SPACE S | ABBE NUMBER $\gamma$ |
|---|---|---|---|---|---|
| I | $R_1 = 81.092$ | $T_1 = 3.0$ | $ND_1 = 1.503781$ |  | $\gamma_1 = 66.92$ |
|  | $R_2 = \infty$ |  |  | $S_1 = 3.00$ to $49.34$ |  |
| II | $R_3 = -51.035$ | $T_2 = 8.0$ | $ND_2 = 1.503781$ |  | $\gamma_2 = 66.92$ |
|  | $R_4 = 51.035$ |  |  | $S_2 = 49.34$ to $3.00$ |  |
|  | $R_5 = 35.416$ |  |  |  |  |

Continued

|   | RADIUS R | THICKNESS T | REFRACTIVE INDEX ND | SPACE S | ABBE NUMBER γ |
|---|---|---|---|---|---|
| III | $R_6 = -35.416$ | $T_3 = 2.5$ | $ND_3 = 1.636359$ | | $\gamma_3 = 35.34$ |
|  |  |  |  | $S_3 = 3.00$ to $49.34$ | |
| IV | $R_7 = -51.035$<br>$R_8 = 51.035$ | $T_4 = 8.0$ | $ND_4 = 1.503781$ | | $\gamma_4 = 66.92$ |
|  |  |  |  | $S_4 = 127.24$ to $80.90$ | |
| V | $R_9 = -84.926$<br>$R_{10} = \infty$ | $T_5 = 4.0$ | $ND_5 = 1.51680$ | | $\gamma_5 = 64.17$ |
|  |  |  |  | $S_5 = 21.00$<br>$S_6 = \sim 36$<br>$S_7 = 62.8$<br>$S_8 = 167.27$ | |

Referring now to FIG. 2, the abscissa is in millimeter units and represents the distance of the positive element and the ordinate fixed negative element in the zoom unit plotted against the vertical axis in millimeters to show deviation from the image of the field diaphragm FD' projected through the zoom system alone in the direction of the light source. The minimal deviation, slightly over 1 millimeter and the plurality of precise alignment points clearly demonstrate the optical compensation of the preferred embodiment.

What is claimed is:

1. In a transmitted light microscope illumination system having a light source, an adjustable field diaphragm, an adjustable aperture stop and a condenser having a front focal plane all in optical alignment along an axis, the adjustable aperture stop being positioned near the front focal plane, the improvement comprising an optically compensated zoom unit consisting of positive-negative-positive lens elements, said negative lens element being fixed in position and said positive elements being rigidly coupled and axially movable, said zoom unit being located between the light source and field diaphragm, an intermediate image of said light source being located between the fixed element of said zoom and said field diaphragm, said zoom unit having a substantially stationary back field diaphragm image plane such that the adjustable field diaphragm is filled with light when said aperture stop and said field diaphragm are varied over a wide range and an image of the light source extends completely across the adjustable aperture stop at all positions of adjustment.

2. The improvement of claim 1 wherein lens radii (R), thicknesses (T), and spacings (S) are expressed in millimeters and a negative sign indicates lens radii on centers of curvature on the field diaphragm side of said lens:

|   | RADIUS R | THICKNESS T | REFRACTIVE INDEX ND | SPACE S | ABBE NUMBER γ |
|---|---|---|---|---|---|
| II | $R_3 = -51.035$<br>$R_1 = 51.035$ | $T_2 = 8.0$ | $ND_2 = 1.503781$ | | $\gamma 2 = 66.92$ |
|  |  |  |  | $S_2 = 49.34$ to $3.00$ | |
| III | $R_5 = 35.416$<br>$R_6 = -35.416$ | $T_3 = 2.5$ | $ND_3 = 1.636359$ | | $\gamma 3 = 35.34$ |
|  |  |  |  | $S_3 = 3.00$ to $49.34$ | |
| IV | $R_7 = -51.035$<br>$R_8 = 51.035$ | $T_4 = 8.0$ | $ND_4 = 1.503781$ | | $\gamma 4 = 66.92$ |
|  |  |  |  | $S_4 = 127.24$ to $80.90$<br>$S_6 = \sim 36$<br>$S_7 = 62.8$ | |

3. The improvement of claim 2 further including a collector lens and telescope lens having the values set forth in the following table:

|   | Radius R | Thickness T | Refractive Index ND | Space S | Abbe Number γ |
|---|---|---|---|---|---|
| I | $R_1 = 81.092$<br>$R_2 = \infty$ | $T_1 = 3.0$ | $ND_1 = 1.503781$ | | $\gamma_1 = 66.92$ |
|  |  |  |  | $S_1 = 3.00$ to $49.34$ | |
| V | $R_9 = -84.926$<br>$R_{10} = \infty$ | $T_5 = 4.0$ | $ND_5 = 1.51680$ | | $\gamma_5 = 64.17$ |
|  |  |  |  | $S_5 = 21.00$<br>$S_8 = 167.27$. | |

\* \* \* \* \*